US008543341B2

(12) United States Patent
Rajagopalan et al.

(10) Patent No.: US 8,543,341 B2
(45) Date of Patent: Sep. 24, 2013

(54) SYSTEM AND METHOD FOR MONITORING HEALTH OF AIRFOILS

(75) Inventors: Venkatesh Rajagopalan, Bangalore (IN); Vivek Venugopal Badami, Schenectady, NY (US); Rahul Srinivas Prabhu, Bangalore (IN); Ajay Kumar Behera, Bangalore (IN); Aninda Bhattacharya, Bangalore (IN)

(73) Assignee: General Electric Company, Niskayuna, NY (US)

( * ) Notice: Subject to any disclaimer, the term of this patent is extended or adjusted under 35 U.S.C. 154(b) by 347 days.

(21) Appl. No.: 12/825,763

(22) Filed: Jun. 29, 2010

(65) Prior Publication Data

US 2011/0320137 A1 Dec. 29, 2011

(51) Int. Cl.
*G06F 19/00* (2011.01)

(52) U.S. Cl.
USPC .......... 702/34

(58) Field of Classification Search
USPC .......... 702/34
See application file for complete search history.

(56) References Cited

U.S. PATENT DOCUMENTS 4,887,468 A * 12/1989 McKendree et al. .......... 73/660
5,206,816 A 4/1993 Hill et al.
5,331,085 A 7/1994 Northrop et al.
5,974,882 A 11/1999 Heath
6,594,619 B1 7/2003 von Flotow
6,785,635 B2 8/2004 von Flotow
6,791,954 B1 9/2004 Cheng et al.
7,383,136 B1 6/2008 Griffin et al.
7,548,830 B2 6/2009 Goebel et al.
2006/0000283 A1 1/2006 Twerdochlib
2008/0206057 A1 8/2008 Twerdochlib
2009/0019925 A1 1/2009 Moen
2009/0301055 A1 12/2009 Kallappa
2010/0011846 A1 1/2010 Krok et al.
2010/0161245 A1* 6/2010 Rai et al. .......... 702/35

OTHER PUBLICATIONS

A. von Flotow et al., Turbine Rotor Health Management with Blade-Tip Sensors: From Laboratory Tool to Fielded System, 2001,10 Pages.
EPO Search Report; Application No. 11171242.8-1267 dated Jun. 30, 2012.
Lebold, et al.,Using torsional vibration analysis as a synergistic method for crack detection in rotating equipment, IEEE, Aerospace Conference, Mar. 6-13, 2004,6 ,University Park, PA, USA.

* cited by examiner

*Primary Examiner* — Edward Raymond
(74) *Attorney, Agent, or Firm* — Scott J. Asmus

(57) ABSTRACT

A method for monitoring the health of one or more blades is presented. The method includes the steps of determining a delta TOA corresponding to each of the one or more blades based upon respective actual time of arrival (TOA) of the one or more blades, determining a normalized delta TOA corresponding to each of the one or more blades by removing effects of one or more operational data from the delta TOA, and determining a corrected delta TOA corresponding to each of the one or more blades by removing effects of reseating of the one or more blades from the normalized delta TOA.

19 Claims, 6 Drawing Sheets

SYSTEM AND METHOD FOR MONITORING HEALTH OF AIRFOILS

BACKGROUND

Embodiments of the disclosure relates generally to systems and methods for monitoring health of rotor blades or airfoils.

Rotor blades or airfoils play a crucial role in many devices with several examples including axial compressors, turbines, engines, turbo-machines, or the like. For example, an axial compressor has a series of stages with each stage comprising a row of rotor blades or airfoils followed by a row of static blades or static airfoils. Accordingly, each stage comprises a pair of rotor blades or airfoils and static airfoils. Typically, the rotor blades or airfoils increase the kinetic energy of a fluid that enters the axial compressor through an inlet. Furthermore, the static blades or static airfoils generally convert the increased kinetic energy of the fluid into static pressure through diffusion. Accordingly, the rotor blades or airfoils and static airfoils play a crucial role to increase the pressure of the fluid.

Furthermore, the rotor blades or airfoils and the static airfoils are more crucial due to wide and varied applications of the axial compressors that include the airfoils. Axial compressors, for example, may be used in a number of devices, such as, land based gas turbines, jet engines, high speed ship engines, small scale power stations, or the like. In addition, the axial compressors may be used in varied applications, such as, large volume air separation plants, blast furnace air, fluid catalytic cracking air, propane dehydrogenation, or the like.

The airfoils operate for long hours under extreme and varied operating conditions such as, high speed, pressure and temperature that effect the health of the airfoils. In addition to the extreme and varied conditions, certain other factors lead to fatigue and stress of the airfoils. The factors, for example, may include inertial forces including centrifugal force, pressure, resonant frequencies of the airfoils, vibrations in the airfoils, vibratory stresses, temperature stresses, reseating of the airfoils, load of the gas or other fluid, or the like. A prolonged increase in stress and fatigue over a period of time leads to defects and cracks in the airfoils. One or more of the cracks may widen with time to result in a liberation of an airfoil or a portion of the airfoil. The liberation of airfoil may be hazardous for the device that includes the airfoils, and thus may lead to enormous monetary losses. In addition, it may be unsafe and horrendous for people near the device.

Accordingly, it is highly desirable to develop a system and method that may predict health of airfoils in real time. More particularly, it is desirable to develop a system and method that may predict cracks or fractures in real time.

BRIEF DESCRIPTION

Briefly in accordance with one aspect of the technique, a method for monitoring the health of one or more blades is presented. The method includes the steps of determining a delta TOA corresponding to each of the one or more blades based upon respective actual time of arrival (TOA) of the one or more blades, determining a normalized delta TOA corresponding to each of the one or more blades by removing effects of one or more operational data from the delta TOA, and determining a corrected delta TOA corresponding to each of the one or more blades by removing effects of reseating of the one or more blades from the normalized delta TOA.

In accordance with an aspect, a system including a processing subsystem is presented. The processing subsystem determines a delta TOA corresponding to each of the one or more blades based upon respective actual time of arrival (TOA) of the one or more blades, determines a normalized delta TOA corresponding to each of the one or more blades by removing effects of one or more operational data from the delta TOA, and determines a corrected delta TOA corresponding to each of the one or more blades by removing effects of reseating of the one or more blades from the normalized delta TOA.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
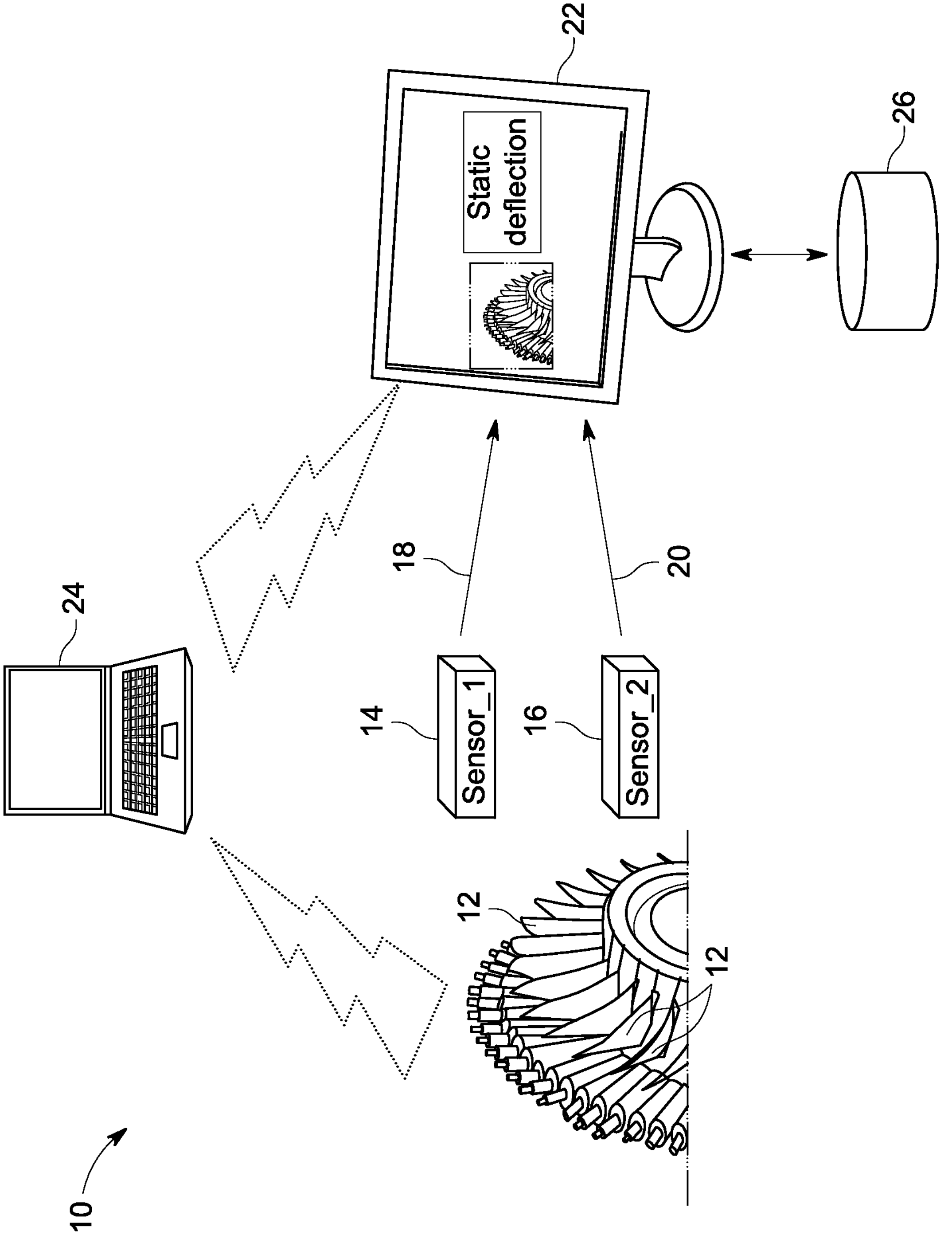
FIG. 1 is an exemplary diagrammatic illustration of a blade health monitoring system, in accordance with an embodiment of the present system.

As discussed in detail below, embodiments of the present system and techniques evaluate the health of one or more blades or airfoils. More particularly, the present system and techniques determine static deflection of the blades or airfoils due to one or more defects or cracks in the blades or airfoils. Hereinafter, the terms "airfoils" and "blades" will be used interchangeably. The static deflection, for example, may be used to refer to a steady change in an original or expected position of a blade from the expected or original position of the blade. Certain embodiments of the present system and techniques also determine dynamic deflection corresponding to the blades. As used herein, the term, "dynamic deflection" may be used to refer to amplitude of vibration of a blade over the mean position of the blade.

In operation, a time of arrival (TOA) of blades at a reference position may vary from an expected TOA due to the one or more cracks or defects in the blades. Accordingly, the variation in the TOA of the blades may be used to determine the static deflection of the blades. As used herein, the term "expected TOA" may be used to refer to a TOA of a blade at a reference position when there are no defects or cracks in the blade and the blade is working in an ideal situation, load conditions are optimal, and the vibrations in the blade are minimal. Hereinafter, for ease of understanding, the word "TOA" and the term "actual TOA" will be used interchangeably.

However, in addition to the cracks or defects in the blades, the TOA may also vary due to one or more operational data and reseating of blades. The operational data, for example, may include an inlet guide vane (IGV) angle, a load, speed, mass flow, discharge pressure, or the like. As used herein, the term "reseating of a blade" may be used to refer to a locking of a blade at a position different from the original or expected position of the blade in joints, such as, a dovetail joint. Typically, the blades are fastened to a rotor via one or more joints, such as, dovetail joints. During start up of a device that includes the blades, the blades may shift from their original positions in the joints and may lock in the joints at positions that are different from the original positions of the blades. By way of an example, the device may include a gas turbine, a compressor, or the like. The locking of the blades in the joints at the positions different from the original positions of the blades is referred to as reseating of the blades. The change in the positions of the blades may vary actual TOA of the blades.

Consequently, due to the effects of the operational data and the reseating of blades, the static deflection that is determined based upon the actual TOA of the blades vary or exceed an exact or accurate static deflection due to the crack or defect in the blades. Accordingly, it is crucial to negate the effects of the operational data and the reseating of the blades on the actual TOA for the determination of the exact static deflection, hereinafter "static deflection." Certain embodiments of the present techniques negate the effects of one or more of the operational data and the reseating of the blades from the actual TOA of the blades to determine the static deflection. Certain other embodiments of the present techniques normalize or compensate the effects of the operational data on the actual TOA.

FIG. 1 is a diagrammatic illustration of a rotor blade health monitoring system 10, in accordance with an embodiment of the present system. As shown in FIG. 1, the system 10 includes one or more blades or airfoils 12 that are monitored by the system 10 to determine static deflection of the blades 12. In certain embodiments, the system 10 also determines dynamic deflection corresponding to the blades 12. As shown in the presently contemplated configuration, the system 10 includes one or more sensors 14, 16. Each of the sensors 14, 16 generate TOA signals 18, 20, respectively that are representative of actual TOA of the blades 12 at a reference point for a particular time period. In one embodiment, the sensors 14, 16 sense an arrival of the one or more blades 12 at the reference point to generate the TOA signals 18, 20. The reference point, for example, may be underneath the sensors 14, 16 or adjacent to the sensors 14, 16. In an embodiment, each of the TOA signals 18, 20 is sampled and/or measured for a particular time period and is used for determining actual TOA of a blade. The actual TOA, for example, may be measured in units of time or degrees.

In one embodiment, the sensors 14, 16 may sense an arrival of the leading edge of the one or more blades 12 to generate the TOA signals 18, 20. In another embodiment, the sensors 14, 16 may sense an arrival of the trailing edge of the one or more blades 12 to generate the signals 18, 20. In still another embodiment, the sensor 14 may sense an arrival of the leading edge of the one or more blades 12 to generate the TOA signals 18 and, the sensor 16 may sense an arrival of the trailing edge of the one or more blades 12 to generate the TOA signals 20, or vice versa. The sensors 14, 16, for example, may be mounted adjacent to the one or more blades 12 on a stationary object in a position such that an arrival of the one or more blades 12 may be sensed efficiently. In one embodiment, at least one of the sensors 14, 16 is mounted on a casing (not shown) of the one or more blades 12. By way of a non-limiting example, the sensors 14, 16 may be magnetic sensors, capacitive sensors, eddy current sensors, or the like.

As illustrated in the presently contemplated configuration, the TOA signals 18, 20 are received by a processing subsystem 22. The processing subsystem 22 determines actual TOA of the one or more blades 12 based upon the TOA signals 18, 20. Furthermore, the processing subsystem 22 determines static deflection of the one or more blades 12 based upon the actual TOA of the one or more blades 12. More particularly, the processing subsystem 22 is configured to determine the static deflection of the one or more of the blades 12 by processing the actual TOA of the one or more blades 12. As previously noted the actual TOA of the blades 12 may be affected by one or more operational data and reseating of the blades 12.

Consequently, the static deflection that is determined based upon the actual TOA of the one or more blades 12 may be an exaggerated value due to the effects of the operational data on the actual TOA and the reseating of the blades 12. For example, due to the effects of the operational data and the reseating of blades 12 on the actual TOA of the blades 12, the static deflection that is determined based upon the actual TOA of blades 12 may show one or more defects or cracks in the blades 12 even when no cracks or defects exist in the blades 12. Accordingly, in one embodiment, the processing subsystem 22 determines the effects of the one or more operational data on the actual TOA of the one or more blades 12. Furthermore, the processing subsystem 22 determines the static deflection by deducting the effects of the one or more operational data on the actual TOA of the one or more blades 12. As previously noted, the operational data may include inlet guide vane (IGV) angle, a load variation, reseating of a blade, asynchronous vibration, synchronous vibration, variation of speed, temperature, speed, or the like. The processing subsystem 22, for example, may receive the operational data from an onsite monitoring machine (OSM) 24 that monitors the operational data via sensors, cameras, and other devices. In addition, the processing subsystem 22 normalizes the effects of the reseating of the blades on the actual TOA of the blades 12. The determination of the static deflection by deducting or normalizing the effects of the operational data on the actual TOA will be explained in greater detail with reference to FIGS. 2-5. The processing subsystem 22 is also configured to determine dynamic deflection corresponding to the one or more blades 12 based upon the static deflection and the actual TOA of the one or more blades 12. In one embodiment, the processing subsystem 22 may have a data repository 26 that stores data, such as, static deflection, dynamic deflection, TOA, delta TOA, any intermediate data, or the like.

Figure 2:
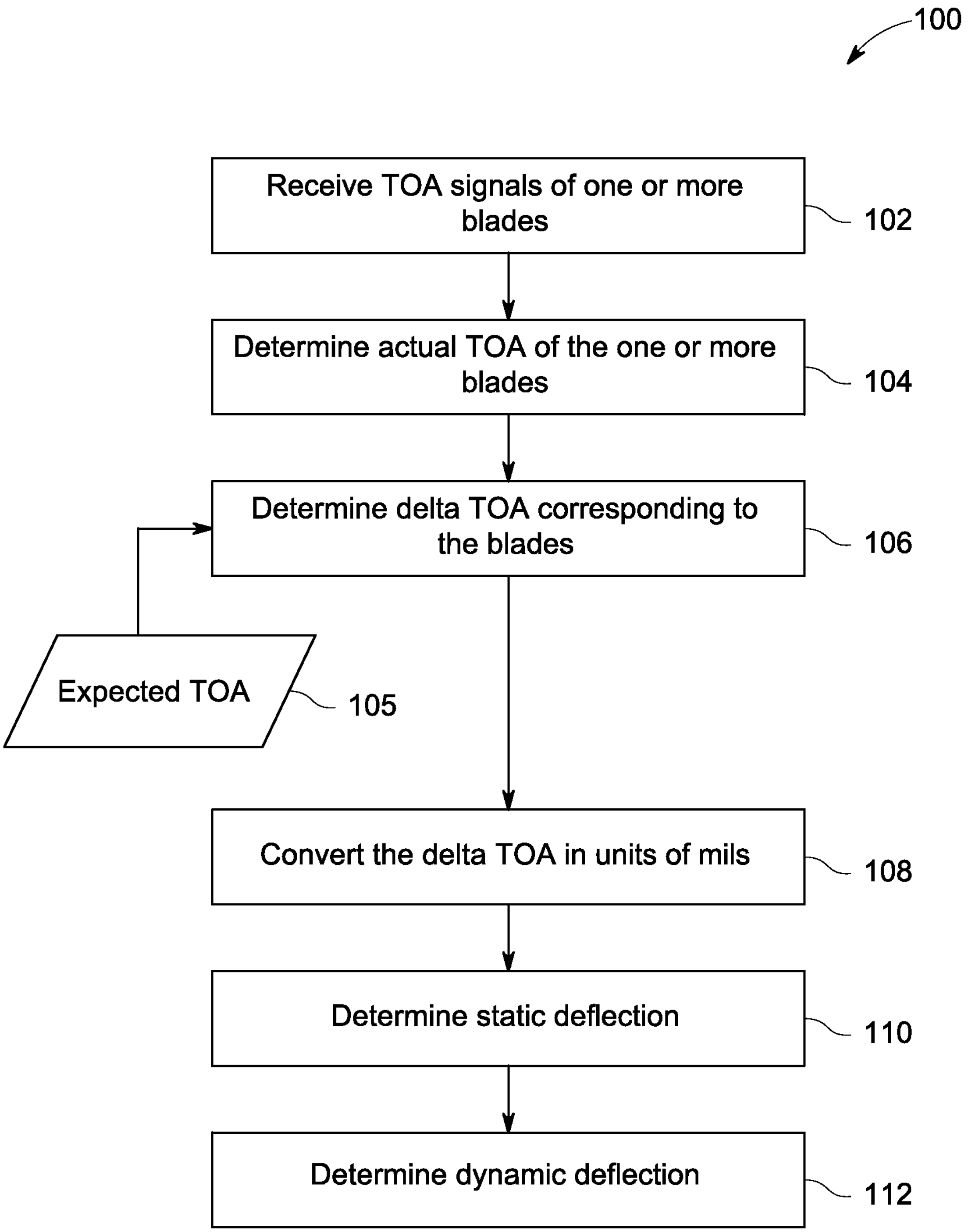
FIG. 2 is a flow chart representing an exemplary method for determining static deflection and dynamic deflection of a blade, in accordance with an embodiment of the present techniques.

Referring now to FIG. 2, a flowchart representing an exemplary method 100 for determining static deflection and dynamic deflection of one or more blades, in accordance with an embodiment of the invention, is depicted. The one or more blades, for example, may be the one or more blades 12 (see FIG. 1). The method starts at step 102 where TOA signals corresponding to each of the one or more blades may be received by a processing subsystem, such as, the processing subsystem 22 (see FIG. 1). As previously noted with reference to FIG. 1, the TOA signals may be generated by a sensor, such as, the sensors 14, 16 (see FIG. 1). In addition, the TOA signals, for example, may be the TOA signals 18, 20.

Furthermore, at step 104 actual TOA corresponding to each of the one or more blades is determined by the processing subsystem. The processing subsystem determines the actual TOA utilizing TOA signals corresponding to each of the one or more blades. More particularly, the processing subsystem determines one or more actual TOA corresponding to a blade utilizing a TOA signal corresponding to the blade. At step 106, a delta TOA corresponding to each of the one or more blades may be determined. The delta TOA corresponding to a blade, for example, may be a difference of an actual TOA corresponding to the blade that is determined at step 104 and an expected TOA 105 corresponding to the blade. It may be noted that the delta TOA corresponding to the blade is representative of a variation from the expected TOA 105 of the blade at a time instant. The delta TOA, for example, may be determined using the following equation (1):

$$\Delta TOA_k(t)=TOA_{ACT(k)}(t)-ToA_{exp(k)} \quad (1)$$

where $\Delta TOA_k(t)$ is a delta TOA corresponding to a blade k at a time instant t or a variation from the expected TOA corresponding to the blade k at the time instant t, $TOA_{act(k)}$ is an actual TOA corresponding to the blade k at the time instant t, and $TOA_{exp(k)}$ is an expected TOA corresponding to the blade k.

As used herein, the term “expected TOA” may be used to refer to an actual TOA of a blade at a reference position when there are no defects or cracks in the blade and the blade is working in an operational state when effects of operational data on the actual TOA are minimal. In one embodiment, an expected TOA corresponding to a blade may be determined by equating an actual TOA corresponding to the blade to the expected TOA of the blade when a device that includes the blade has been recently commissioned or bought. Such a determination assumes that since the device has been recently commissioned or bought, all the blades are working in an ideal situation, the load conditions are optimal, and the vibrations in the blade are minimal. In another embodiment, the expected TOA may be determined by taking an average of actual times of arrival (TOAs) of all the blades in the device. The device, for example, may include axial compressors, land based gas turbines, jet engines, high speed ship engines, small scale power stations, or the like. It may be noted that the delta TOA is represented in units of time or degrees.

In one embodiment, at step 108, the units of the delta TOA corresponding to each of the one or more blades may be converted in to units of mils. In one embodiment, the delta TOA corresponding to each of the one or more blades that is in units of degrees may be converted in to units of mils using the following equation (2):

$$\Delta ToA_{mils(k)}(t) = \frac{2\pi R \times \Delta ToA_{Deg(k)}(t)}{360} \quad (2)$$

where $\Delta ToA_{mils(k)}$ (t) is a delta TOA of a blade k at a t instant of time and the delta TOA is in units of mils, $\Delta ToA_{Deg(k)}(t)$ is a delta TOA of the blade k at the t instant of time and the delta TOA is in units of degrees and, R is a radius measured from the centre of the rotor to the tip of the blade k. The radius R is in units of mils. In another embodiment, the delta TOA that is in units of seconds may be converted in to units of mils using the following equation (3):

$$\Delta ToA_{mils(k)}(t) = \frac{2\pi R \times N \times \Delta ToA_{sec(k)}(t)}{60} \quad (3)$$

where $\Delta ToA_{mils(k)}(t)$ is a delta TOA of a blade k at a t instant of time and the delta TOA is in units of mils, $\Delta ToA_{sec(k)}(t)$ is a delta TOA of the blade k at the t instant of time and the delta TOA is in units of degrees and R is a radius of a blade from the centre of a rotor of the blade. The radius R is in units of mils.

Moreover, at step 110, the static deflection of each of the one or more blades is determined based upon the delta TOA. The determination of the static deflection of the one or more blades will be explained in greater detail with reference to FIGS. 3-5. Subsequently at step 112, the dynamic deflection corresponding to the one or more blades may be determined. In one embodiment, a dynamic deflection corresponding to a blade may be determined by subtracting a static deflection corresponding to the blade from a delta TOA corresponding to the blade. In another embodiment, a dynamic deflection corresponding to a blade may be determined by subtracting a static deflection corresponding to the blade from a filtered delta TOA corresponding to the blade. The filtered delta TOA, for example, may be determined by filtering a delta TOA corresponding to the blade that is determined at step 106. The delta TOA may be filtered utilizing one or more techniques including average filtering, median filtering, or the like.

Figure 3:
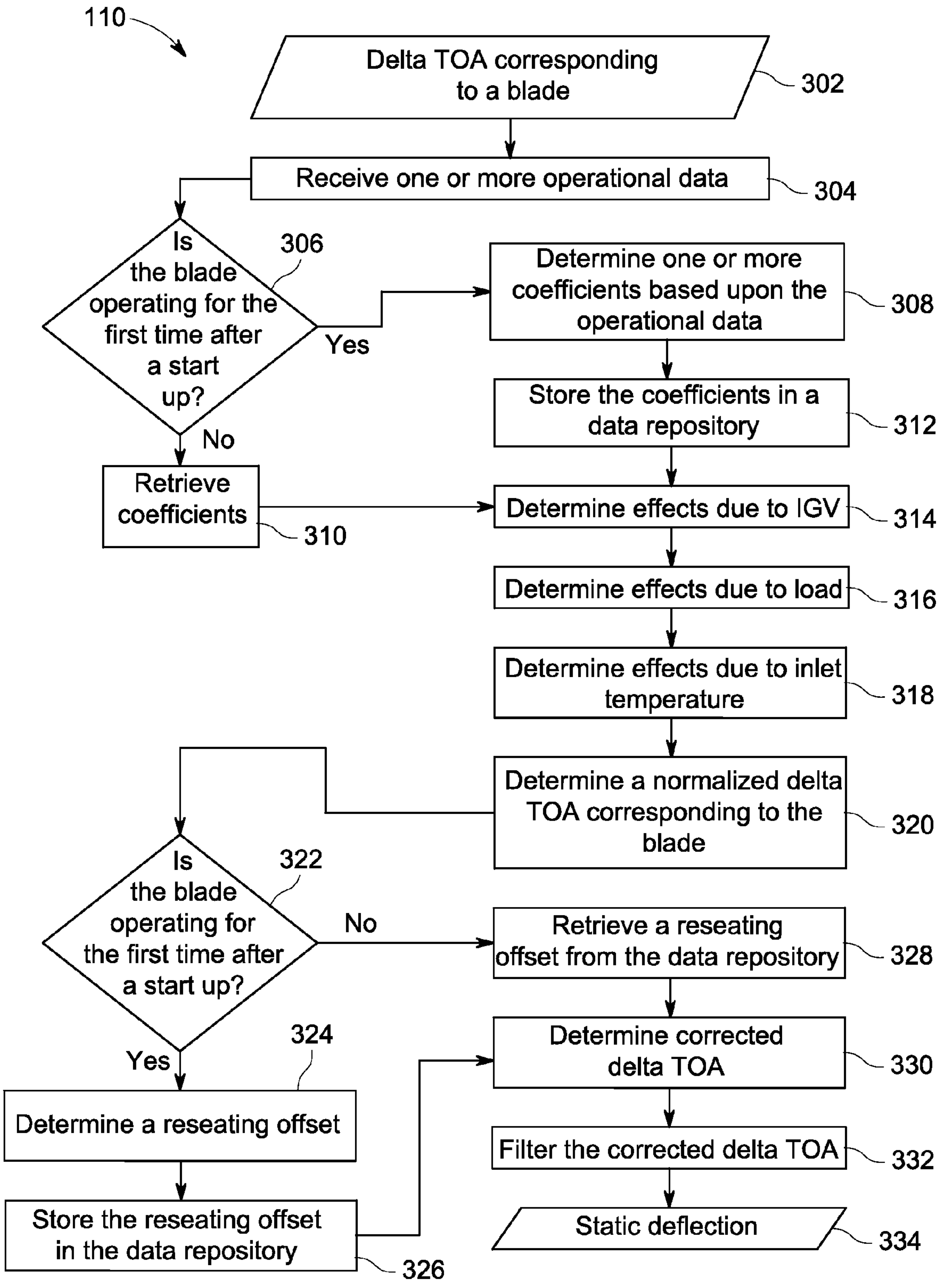
FIG. 3 is a flowchart representing an exemplary method for determining static deflection of a blade, in accordance with an embodiment of the present techniques.

As previously noted, actual TOA of one or more blades may be used to determine static deflection of the blades. However, one or more operational data and reseating of the blades may effect the actual TOA of the blades. Consequently, the static deflection that is determined based upon the actual TOA of the blades may not be accurate static deflection. Accordingly, it is essential to remove or deduct the effects of the one or more operational data and reseating of the blades on the actual TOA for the determination of the exact static deflection. An exemplary method for determining the static deflection by deducting the effects of the one or more operational data and reseating of the blades from the actual TOA or delta TOA that is determined based upon the actual TOA will be explained with reference to FIG. 3. Referring now to FIG. 3, a flowchart representing an exemplary method 110 for determining static deflection of a blade, in accordance with an embodiment of the invention, is depicted. More particularly, step 110 of FIG. 2 is described in greater detail in accordance with an exemplary aspect of the present techniques.

As shown in FIG. 3, reference numeral 302 is representative of a delta TOA corresponding to the blade. In one embodiment, the delta TOA 302 may be determined utilizing the techniques described with reference to step 106 of FIG. 2. Furthermore, at step 304, one or more operational data corresponding to the blade or a device that includes the blade may be received. As previously noted, the operational data, for example, may include (IGV) angle, load, temperature, speed, mass flow, discharge pressure, or the like. The operational data, for example, may be received by the processing subsystem 22 from the onsite monitor 24 (see FIG. 1).

Furthermore, at step 306, a check may be carried out to verify if the blade is operating for the first time after a start up of the device that includes the blade. At step 306, if it is the determined that the blade is operating for the first time after the start up, then the control may be transferred to step 308. At step 308, one or more coefficients are determined based upon one or more portions of the operational data. The coefficients, for example, may be determined by utilizing the following equation (4):

$$\Delta TOA_k=\overline{A}\overline{D} \quad (4)$$

where $\Delta TOA_k$ is a delta TOA of a blade k, $\overline{D}$ is one or more portions of operational data and $\overline{A}$ is a coefficient. In one embodiment, the coefficients may be determined by forming a linear combination of the one or more portions of operational data. Furthermore, the values of the one or more portions of operational data may be substituted to determine the coefficients. Moreover, at step 312, the coefficients that have been determined at step 308 are stored in a data repository, such as, the data repository 26 (see FIG. 1). It may be noted that when the coefficients are stored in the data repository any other existing coefficients in the data repository may be erased.

With returning reference to step 306 if it is determined that the blade is not operating for the first time after a start up, then the control may be transferred to step 310. At step 310, the coefficients are retrieved from the data repository. The coefficients are retrieved at step 310 with an assumption that the coefficients have already been determined during a start up of the device that includes the blade and thus, already exist in the data repository. Subsequently at step 314, effects due to IGV angle on the delta TOA 302 may be determined. In one embodiment, the effects due to IGV may be determined using the following exemplary equation (5):

$$T_{IGV}(t)=f(IGV(t)) \qquad (5)$$

where $T_{IGV}(t)$ is effects of IGV on a delta TOA at a t instant of time, IGV (t) is IGV angle at the t instant of time and $f$ is a function of the IGV(t). In one embodiment, the function of IGV may be determined by determining a multiple of IGV(t) and a coefficient corresponding to the IGV(t).

At step 316, effects on the delta TOA 302 due to load may be determined. The effects on the delta TOA 302 due to the load may be determined utilizing the following equation (6):

$$T_{load}(t)=g(DWATT(t)) \qquad (6)$$

where $T_{load}(t)$ is effects of load on a delta TOA at a t instant of time, DWATT is load at the t instant of time, and g is a function of the load. In one embodiment, the function of DWATT may be determined by determining a multiple of DWATT(t) and a coefficient corresponding to the DWATT. In another embodiment, the function of DWATT may be determined by determining a linear combination of the multiple of DWATT(t) and the coefficient and, another coefficient corresponding to the DWATT.

Subsequently, at step 318, effects due to inlet temperature (CTIM) on the delta TOA 302 may be determined. The effects due to the inlet temperature (CTIM) may be determined utilizing the following equation (7):

$$T_{CTIM}(t)=d(CTIM(t)) \qquad (7)$$

where $T_{CTIM}$ is a value of the effects on a delta TOA due to an inlet temperature at a t instant of time, CTIM(t) is the inlet temperature at the t instant of time, d is a coefficient corresponding to the inlet temperature. Subsequent to the determination of the effects on the delta TOA 302 due to IGV at step 314, load at step 316 and CTIM at step 318, a normalized delta TOA is determined at step 320. The normalized delta TOA, for example, may be determined by subtracting the effects of the operational data, such as, the IGV, the load and the inlet temperature (CTIM) from the delta TOA 302.

In one embodiment, the normalized delta TOA, for example, may be determined using the following exemplary equation (8):

$$\text{Norm\_}\Delta TOA_k(t)=\Delta TOA_k(t)-T_{load}(t)-T_{CTIM}(t)-T_{IGV}(t) \qquad (8)$$

where Norm_$\Delta TOA_k(t)$ is a normalized delta TOA corresponding to a blade k at a t instant of time, $\Delta TOA_k(t)$ is a delta TOA corresponding to the blade k at the t instant of time and $T_{load}(t)$,$T_{CTIM}(t)$, $T_{IGV}(t)$ are the effects of the load, inlet temperature and IGV on the delta TOA at the t instant of time, respectively.

Typically, one or more blades are fastened to a rotor via one or more joints, such as, dovetail joints. During start up of the device that includes the blades, the blades may shift from their original positions in the joints and may lock in the joints at positions that are different from the original positions of the blades. The locking of the blades in the joints at the positions different from the original positions of the blades is referred to as reseating of the blades. The change in the positions of the blades may vary actual TOA of the blades. Accordingly, delta TOA and normalized delta TOA that are determined based upon the actual TOA of the blades may not be accurate. More particularly, the delta TOA and the normalized delta TOA may not be accurate due to the reseating of the blades. Accordingly, it is essential to correct the actual TOA, delta TOA or the normalized delta TOA corresponding to the blades to remove effects due to the reseating of the blades. The steps 322-330 correct the normalized delta TOA determined at step 320 and the delta TOA 302 of the blade to remove effects due to a reseating of the blade.

At step 322, a check may be carried out to verify whether the blade is operating for the first time after a start up. At step 322, if it is determined that the blade is operating for the first time after a start up, then the control may be transferred to step 324. At step 324, a reseating offset corresponding to the blade may be determined. As used herein, the term "reseating offset" may be used to refer to a numerical value that may be used to remove effects due to reseating of a blade from delta TOA, actual TOA or a normalized delta TOA of the blade. The determination of the reseating offset will be explained in greater detail with reference to FIG. 6. Subsequently, the reseating offset determined at step 324 may be stored in the data repository at step 326. The reseating offset, for example, may be stored in the data repository 26 (see FIG. 1). It may be noted that in the presently contemplated configuration, the reseating offset is determined when the blade is operating for the first time after the start up as it is assumed that the blade may lock at a position different from the original position of the blade during the start up of the device that includes the blade.

With returning reference to step 322, if it is determined that the blade is not operating for the first time after a start up of the device that includes the blade, then the control may be transferred to step 328. It may be noted that when the blade is not operating for the first time after a start up, it indicates that the reseating offset corresponding to the blade has already been determined after a start up of the device that includes the blade and has already been stored in the data repository. Accordingly, at step 328, a reseating offset corresponding to the blade may be retrieved from the data repository.

Subsequent to the storage of the reseating offset at step 326 or the retrieval of the reseating offset at step 328, a corrected delta TOA may be determined at step 330. In one embodiment, the corrected delta TOA may be determined by correcting the normalized delta TOA that has been determined at step 320 for the reseating of the blade. The corrected delta TOA, for example, may be determined by subtracting the reseating offset from the normalized delta TOA corresponding to the blade. In another embodiment, the corrected delta TOA may be determined by correcting the delta TOA 302. In this embodiment, the corrected delta TOA may be determined by subtracting the reseating offset from the delta TOA 302 corresponding to the blade. Moreover, at step 332, the corrected delta TOA may be filtered to generate static deflection 334. The filtering of the corrected delta TOA may reduce noise from the corrected delta TOA. The corrected delta TOA, for example, may be filtered using median filtering, moving average filtering, or combinations thereof.

As previously noted, one or more operational data effect actual TOA of a plurality of blades. However, the operational data may not affect the actual TOA of the blades uniformly. Accordingly, the actual TOA of one or more of the blades may be affected more in comparison to the actual TOA of other blades in the plurality of blades. Consequently, static deflection corresponding to the one or more of the blades may show defects or cracks in the blades due to the additional effects of the operational data in comparison to static deflection corresponding to the other blades. In addition, the static deflection that is determined based upon the actual TOA of the blades may not be accurate static deflection. Accordingly, it is essential to normalize the effects of the operational data on the actual TOA of the plurality of blades in a device. Exemplary methods for determining static deflection by normalizing effects of one or more operational data on actual TOA or delta TOA that is determined based upon the actual TOA will be explained with reference to FIGS. 4 and 5.

Figure 4:
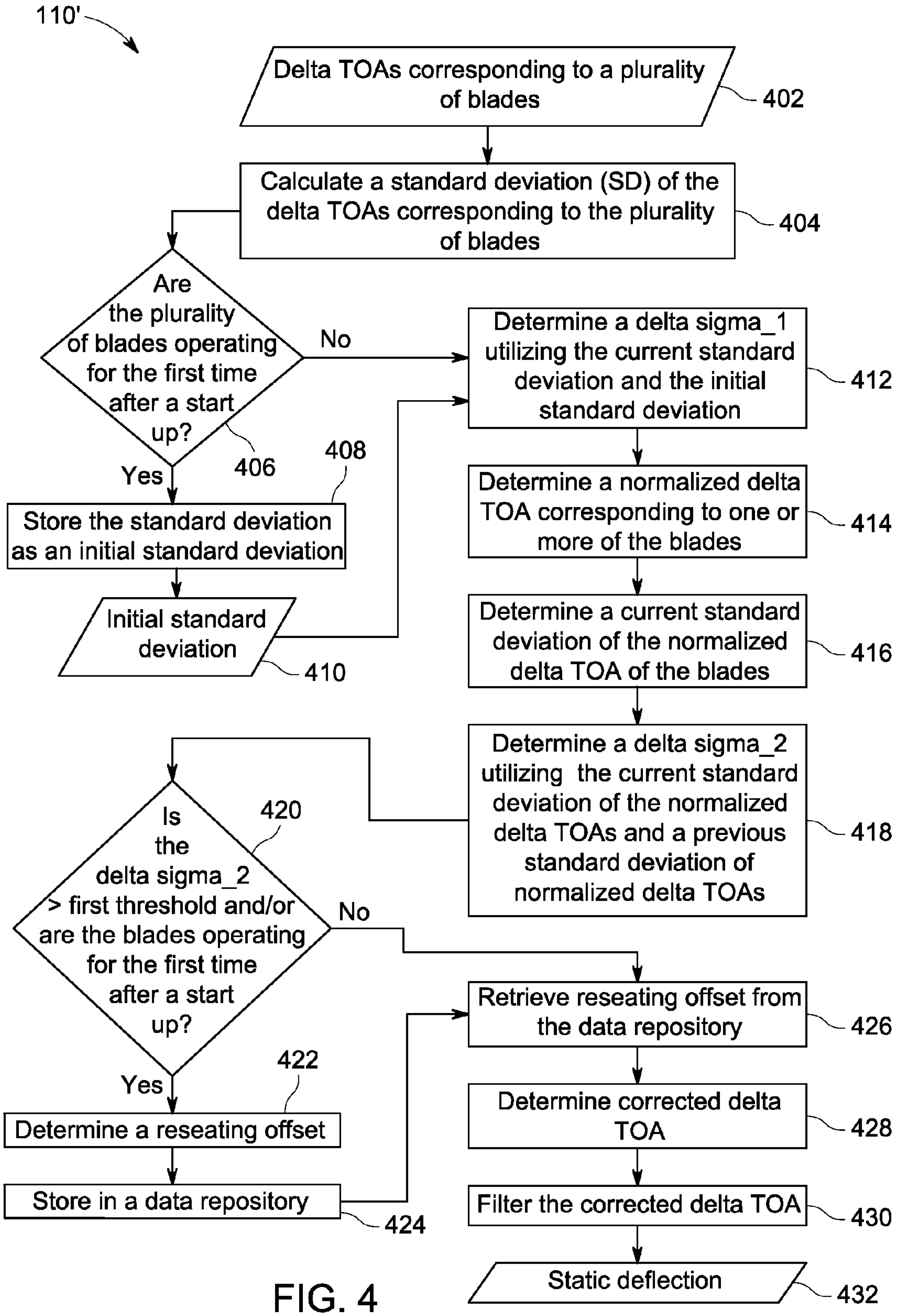
FIG. 4 is a flowchart representing an exemplary method for determining static deflection of a blade, in accordance with another embodiment of the present techniques.

Referring now to FIG. 4, a flowchart representing steps in an exemplary method 110' for determining static deflection in accordance with another embodiment, is depicted. More particularly, FIG. 4 explains step 110 of FIG. 2 in accordance with an embodiment of the present technique for determining the static deflection. As shown in FIG. 4, reference numeral 402 is representative of delta times of arrival (TOAs) corresponding to a plurality of blades in a device, such as, a turbine, axial compressor, or the like. A delta TOA corresponding to each of the plurality of blades may be determined utilizing the techniques explained with reference to step 106 of FIG. 2. In one embodiment, the delta TOAs 402 may be similar to the delta TOA determined at step 106 of FIG. 2.

Furthermore, at step 404, a standard deviation of the delta TOAs corresponding to the plurality of blades may be calculated. For example, when the plurality of blades includes five blades and each of the five blades has a delta TOA as delta $TOA_1$, delta $TOA_2$, delta $TOA_3$, delta $TOA_4$, delta $TOA_5$ then, a standard deviation of the delta $TOA_1$, delta $TOA_2$, delta $TOA_3$, delta $TOA_4$ and delta $TOA_5$ may be calculated at the step 404. Subsequently at step 406, a check may be carried out to determine if the blades are operating for the first time after a start up of a device that includes the plurality of blades. At step 406, if it is determined that the blades are operating for the first time after a start up, then the control may be transferred to step 408.

For ease of understanding, the term "standard deviation" will be hereinafter referred to as "current standard deviation." As shown in FIG. 4, at step 408 the standard deviation that is calculated at step 404 may be stored as an initial standard deviation 410. The initial standard deviation 410 may be stored in a data repository, such as, the data repository 26. As used herein, the term "initial standard deviation" may be referred to as a current standard deviation that is determined when the blades start operating for the first time after a start up. More particularly, the standard deviation that is determined at step 404 may be stored as the initial standard deviation 410 in the data repository.

Referring back to step 406 if it is determined that the blades are not operating for the first time after the start up, then the control may be transferred to step 412. At step 412, a delta sigma_1 may be determined utilizing the current standard deviation determined at step 404 and the initial standard deviation 410. More particularly, the delta sigma_1 may be determined by determining a difference between the current standard deviation that is determined at step 404 and the initial standard deviation 410. It may be noted that when the step 412 is processed for the first time after a start up of the device that includes the plurality of blades, then the values of the initial standard deviation 410 and the current standard deviation determined at step 404 are equivalent. Accordingly, the value of delta sigma_1 may be equal to zero at step 412.

Furthermore, at step 414, a normalized delta TOA corresponding to one or more of the plurality of blades may be determined. The normalized delta TOA, for example, may be determined based upon the following equation (9):

$$\text{Norm\_}\Delta TOA_k(t)=\Delta TOA_k(t)-K^*(\Delta\sigma(t)\_1)-\text{Mean}(\Delta TOA_{1toj}(t)) \quad (9)$$

where Norm_$\Delta TOA_k(t)$ is a normalized delta TOA corresponding to a blade k at a t instant of time, $\Delta TOA_k(t)$ is a delta TOA corresponding to the blade k at the t instant of time and $\Delta\sigma(t)$_1 is a delta sigma_1 at the t instant of time and K is a constant.

In one embodiment, the value of the constant K may be determined based upon a mean of delta TOA corresponding to the blades. In one embodiment, the value of K may be 1. In another embodiment, the value of K may be −1. In still another embodiment the value of K may be 0.

Moreover, at step 416, a current standard deviation of the normalized delta TOA corresponding to the one or more of the plurality of blades may be determined. Subsequently at step 418, a delta sigma_2 may be determined. The delta sigma_2, for example, may be determined by determining a difference between the current standard deviation of the normalized delta TOA and a previous standard deviation of normalized delta TOA. The term "previous standard deviation of normalized delta TOA" may be used to refer to a current standard deviation of normalized delta TOA that is determined at a time step T−1 in comparison to a current standard deviation of normalized delta TOA that is determined at a time step T.

Subsequent to the determination of the delta sigma_2, at step 420 a check may be carried out to verify if the delta sigma_2 is greater than a predetermined first threshold and/or if the plurality of blades are operating for the first time after a start up. The predetermined first threshold may be determined empirically based upon historical delta TOA corresponding to the blades. At step 420 if it is determined that the delta sigma_2 is greater than the predetermined first threshold or the plurality of blades are operating for the first time after a start up, then the control may be transferred to step 422. At step 422, a reseating offset corresponding to the one or more of the plurality of blades may be determined. The determination of the reseating offset will be explained in greater details with reference to FIG. 6. Subsequent to the determination of the reseating offset, at step 424 the reseating offset may be stored in the data repository, such as, the data repository 26 (see FIG. 1).

With returning reference to step 420, when it is determined that the delta sigma_2 is not greater than the predetermined first threshold and the plurality of blades are not operating for the first time after a start up then, the control may be transferred to step 426. At step 426, the reseating offset may be retrieved from the data repository. It may be noted that no reseating offset is generated when the delta sigma_2 is not greater than the predetermined first threshold and the blades are not operating for the first time after a start up. Accordingly, an existing reseating offset from the data repository is retrieved at step 426. Subsequent to the retrieval of the reseating offset, a corrected delta TOA corresponding to the one or more of the plurality of blades may be determined at step 428. The corrected delta TOA, for example, may be determined utilizing the techniques explained with reference to step 330 of FIG. 3. As previously noted with reference to FIG. 3, the corrected delta TOA may be determined utilizing the techniques explained with reference to step 330 of FIG. 3. For example, the corrected delta TOA corresponding to a blade may be determined utilizing the normalized delta TOA corresponding to the blade that is determined at step 414 and a reseating offset corresponding to the blade that is retrieved from the data repository at step 426. In one embodiment, a corrected delta TOA corresponding to a blade may be determined by subtracting a reseating offset corresponding to the blade from delta TOA corresponding to the blade. The delta TOA, for example, may be one of the delta TOA 402 corresponding to the plurality of blades.

Furthermore, at step 430, the corrected delta TOA may be filtered to generate static deflection 432 corresponding to the one or more of the plurality of blades. As previously noted with reference to FIG. 3, the filtering of the corrected delta TOA may reduce noise from the corrected delta TOA. The corrected delta TOA, for example, may be filtered using a median filtering technique, a moving average filtering technique, or combinations thereof.

Figure 5:
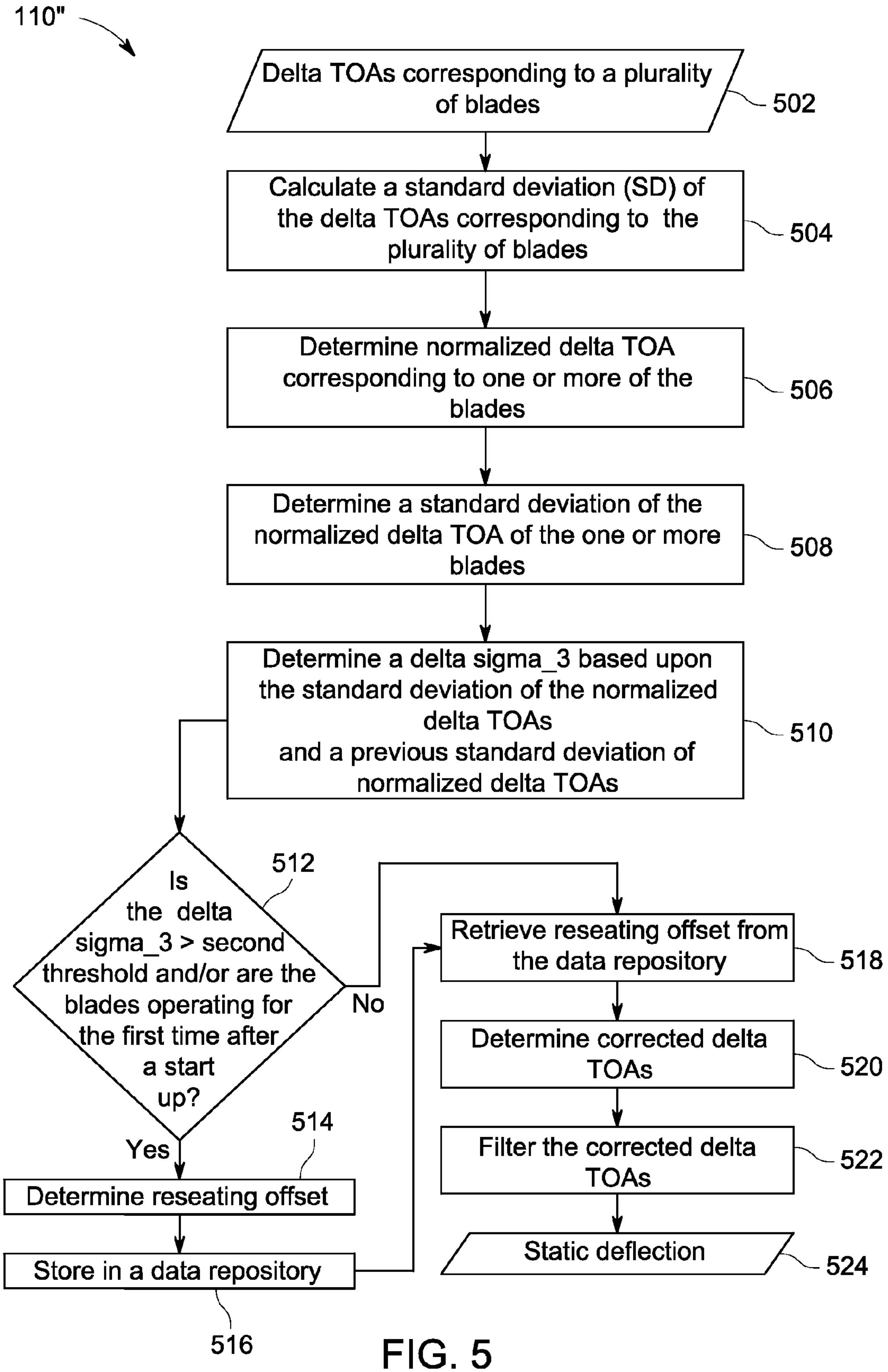
FIG. 5 is a flowchart representing an exemplary method for determining static deflection of a blade, in accordance with still another embodiment of the present techniques.

Referring now to FIG. 5, a flowchart representing steps in an exemplary method 110" for determining static deflection in accordance with another embodiment, is depicted. More particularly, FIG. 5 explains step 110 of FIG. 2 in accordance with an embodiment of the present techniques for determining the static deflection. As shown in FIG. 5, reference numeral 502 is representative of delta times of arrival (TOAs) corresponding to a plurality of blades in a device, such as, a turbine, axial compressor, or the like. A delta TOA corresponding to each of the plurality of blades may be determined utilizing the techniques explained with reference to step 106 of FIG. 2. In one embodiment, the delta TOAs 502 may be similar to the delta TOA determined at step 106 of FIG. 2.

Furthermore, at step 504, a standard deviation of the delta TOAs corresponding to the plurality of blades may be calculated. For example, when the plurality of blades includes five blades and each of the five blades has a delta TOA as delta $TOA_1$, delta $TOA_2$, delta $TOA_3$, delta $TOA_4$, delta $TOA_5$ then, a standard deviation of the delta $TOA_1$, delta $TOA_2$, delta $TOA_3$, delta $TOA_4$ and delta $TOA_5$ may be determined at the step 504. Subsequently at step 506, a normalized delta TOA corresponding to one or more of the plurality of blades may be determined. The normalized delta TOA, for example, may be determined based upon the following equation (10):

$$\text{Norm\_}\Delta TOA_k(t)=(\Delta TOA_k(t)-\text{Mean }\Delta TOA_{1toj}(t))/\text{standard\_deviation}(t) \quad (10)$$

where Norm_$\Delta TOA_k(t)$ is a normalized delta TOA corresponding to a blade k at a t instant of time, $\Delta TOA_k(t)$ is a delta TOA corresponding to the blade k at the t instant of time, Mean $\Delta TOA_{1toj}(t)$ is a mean of delta TOA corresponding to blades 1 to j that includes the blade k.

Moreover, at step 508, a standard deviation of the normalized delta TOA corresponding to the one or more of the plurality of blades may be determined. Subsequently at step 510, a delta sigma_3 may be determined. The delta sigma_3, for example, may be determined by determining a difference between the standard deviation of the normalized delta TOA and a previous standard deviation of normalized delta TOA. The term "previous standard deviation of normalized delta TOA" may be used to refer to a standard deviation of normalized delta TOA that is determined at a time step T−1 in comparison to a standard deviation of normalized delta TOA that is determined at a time step T.

Subsequent to the determination of the delta sigma_3 at step 510, a check may be carried out at step 512 to verify if the delta sigma_3 is greater than a predetermined second threshold and/or if the plurality of blades are operating for the first time after a start up. The predetermined second threshold may be determined empirically based upon historical delta TOA. At step 512 if it is determined that the delta sigma_3 is greater than the predetermined second threshold or the plurality of blades are operating for the first time after a start up, then the control may be transferred to step 514. At step 514, a reseating offset corresponding to each of the one or more of the plurality of blades may be determined. The determination of the reseating offset will be explained in greater details with reference to FIG. 6. Subsequent to the determination of the reseating offset, at step 516 the reseating offset may be stored in the data repository, such as, the data repository 26 (see FIG. 1).

With returning reference to step 512, when it is determined that the delta sigma_3 is not greater than the predetermined second threshold and the plurality of blades are not operating for the first time after a start up then the control may be transferred to step 518. At step 518, a reseating offset corresponding to each of the one or more of the plurality of blades may be retrieved from the data repository. It may be noted that no reseating offset is generated when the delta sigma_3 is not greater than the predetermined second threshold and the blades are not operating for the first time after a start up. Accordingly, an existing reseating offset from the data repository is retrieved at step 518. Subsequent to the retrieval of the reseating offset, a corrected delta TOA corresponding the one or more of the plurality of blades may be determined at step 520. The corrected delta TOA, for example, may be determined utilizing the techniques explained with reference to step 330 of FIG. 3. As previously noted with reference to FIG. 3, the corrected delta TOA may be determined utilizing the techniques described with reference to step 330 of FIG. 3. For example, the corrected delta TOA corresponding to a blade may be determined utilizing the normalized delta TOA corresponding to the blade that is determined at step 506 and a reseating offset corresponding to the blade that is retrieved from the data repository at step 518. In one embodiment, a corrected delta TOA corresponding to a blade may be determined by subtracting a reseating offset corresponding to the blade from a normalized delta TOA corresponding to the blade. In another embodiment, a corrected delta TOA corresponding to a blade may be determined by subtracting a reseating offset corresponding to the blade from delta TOA corresponding to the blade. The delta TOA, for example, may be one of the delta TOA 502 corresponding to the plurality of blades.

Furthermore, at step 522, the corrected delta TOA may be filtered to generate static deflection 524. As previously noted with reference to FIG. 3, the filtering of the corrected delta TOA may reduce noise from the corrected delta TOA. The corrected delta TOA, for example, may be filtered using a median filtering technique, a moving average filtering technique, or combinations thereof.

Figure 6:
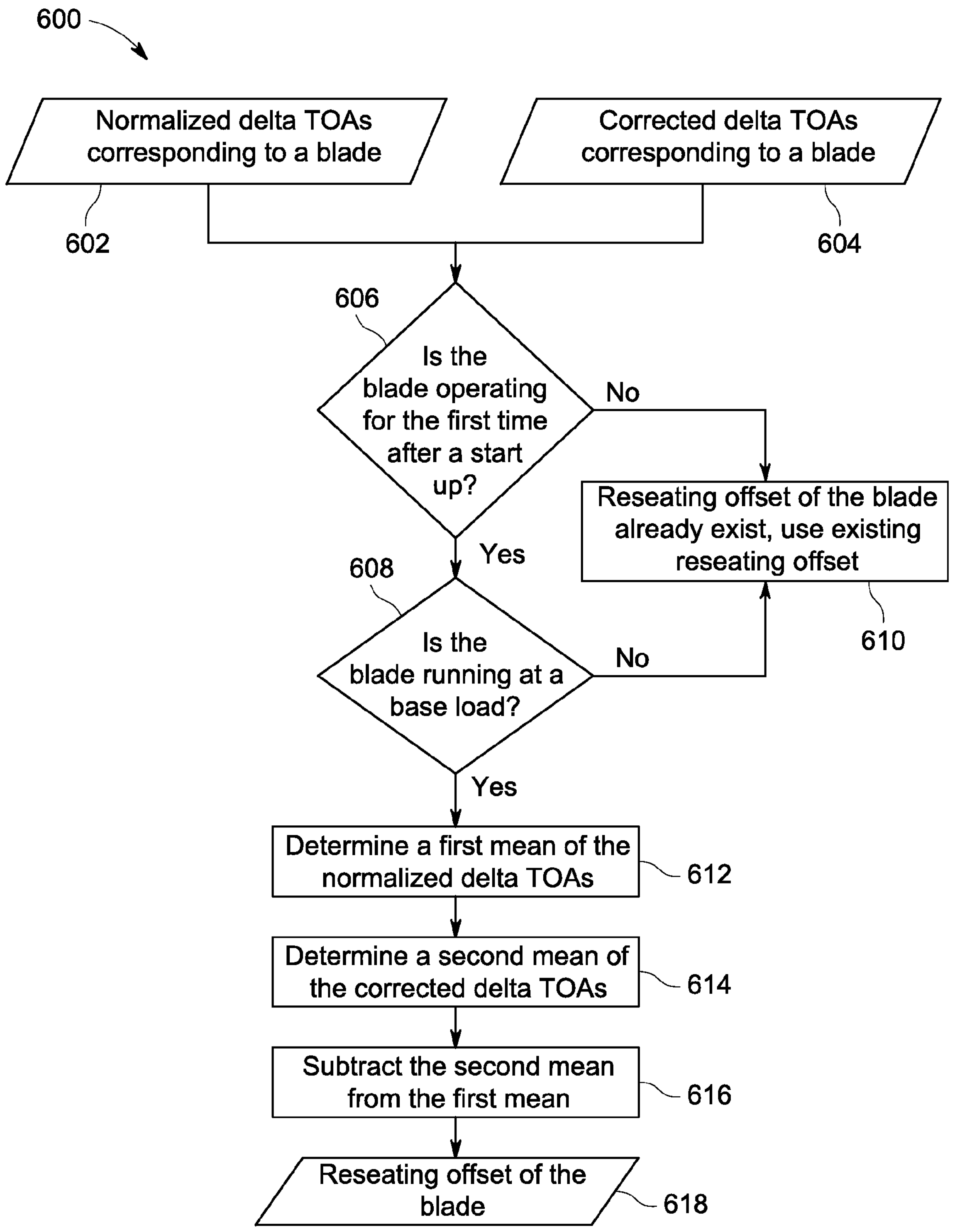
FIG. 6 is a flowchart representing steps in a method for determining a reseating offset corresponding to a blade, in accordance with an embodiment of the present techniques.

Referring now to FIG. 6, a flowchart representing steps in a method 600 for generating a reseating offset corresponding to a blade, in accordance with an embodiment of the present techniques, is depicted. More particularly, method 600 explains steps 328 of FIG. 3, 422 of FIG. 4 and 514 of FIG. 5. As shown in FIG. 6, reference numeral 602 is representative of normalized delta times of arrival (TOAs) corresponding to the blade. In one embodiment, the normalized delta TOAs 602 may be one or more of normalized delta TOAs that have been determined using the techniques described with reference to steps 320 of FIG. 3, 414 of FIG. 4, 506 of FIG. 5. In one embodiment, the normalized delta TOAs 602 are one or more of normalized delta TOAs corresponding to the blade that has been determined after transient events of the blade. The transient events, for example, may include a start up or shutdown of a device that includes the blades, continuous change in the speed of the blades, or the like.

Furthermore, reference numeral 604 is representative of one or more corrected delta TOAs corresponding to the blade that has been determined utilizing normalized delta TOAs that were generated before the transient events. The transient events are transient events after which the normalized delta TOAs 602 were determined. At step 606, a check is carried out to determine if the blade is running for the first time after a start up. At step 606 if it is determined, that the blade is running for the first time after a start up then the control is transferred to step 608. Furthermore, at step 608, a check may be carried out to determine if the blade is running at a base load. At step 608, if it is determined that the blade is not running at a base load then the control may be transferred to step 610. With returning reference to step 606 if it is determined that the blade is not running for the first time after a start up, then control may be transferred to the step 610. At step 610 it is declared that a reseating offset corresponding to the blade already exists in a data repository, such as, the data repository 26 (see FIG. 1). Therefore, a reseating offset is not determined.

With returning reference to step 608, if it is determined that the blade is running at a base load, then the control may be transferred to step 612. At step 612, a first mean of the one or more normalized delta TOAs 602 may be determined. Furthermore, at step 614, a second mean of the one or more corrected delta TOAs 604 may be determined. Subsequent to the determination of the first mean and the second mean, a reseating offset 618 corresponding to the blade may be determined by subtracting the second mean from the first mean at step 616.

The embodiments of the present techniques result in determination of the effects of operational data on TOAs. In addition, the present techniques deduct the effects of operational data from the TOAs to determine normalized delta TOAs. Furthermore, the present techniques normalize the effects of operational data on the TOAs of the blades to determine the normalized delta TOAs. The normalized delta TOAs may be used for determining defects or cracks in the blades. Certain embodiments of the present techniques also facilitate detection of variations in the TOAs of the blade due to reseating of the blades. Also, the determination of the normalized delta TOAs may be used for monitoring the health of the blades. For example, the normalized delta TOAs may be used to determine whether there are one or more cracks in the blades.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A method for monitoring the health of one or more blades, comprising:

determining a delta TOA corresponding to each of the one or more blades based upon respective actual time of arrival (TOA) of the one or more blades by a processing subsystem;

determining one or more coefficients based upon one or more operational data by the processing subsystem;

determining effects of the one or more operational data on the respective actual TOA by utilizing the one or more coefficients and the one or more operational data;

determining a normalized delta TOA corresponding to each of the one or more blades by removing the effects of the one or more operational data from the delta TOA by the processing subsystem; and determining a corrected delta TOA corresponding to each of the one or more blades by removing effects of reseating of the one or more blades from the normalized delta TOA by the processing subsystem.

2. The method of claim 1, wherein determining the delta TOA comprises subtracting the respective actual TOA corresponding to the one or more blades from a respective expected TOA of the one or more blades.

3. The method of claim 2, wherein the respective expected TOA of the one or more blades is a mean of respective actual TOA of the one or more blades.

4. The method of claim 1, wherein removing the effects of the one or more operational data from the delta TOA comprises:

subtracting the effects of the one or more operational data from the delta TOA resulting in the normalized delta TOA.

5. The method of claim 1, wherein determining the one or more coefficients based upon the one or more operational data comprises utilizing the following equation:

$$\Delta TOA_k = \overline{A}\overline{D}$$

where $\Delta TOA_k$ is a delta TOA of a blade k, $\overline{D}$ is one or more portions of operational data and $\overline{A}$ is a coefficient.

6. The method of claim 4, wherein the one or more coefficients are determined when the one or more blades are operating for the first time after a start up.

7. The method of claim 1, further comprising determining a static deflection corresponding to each of the one or more blades by filtering the corrected delta TOA corresponding to each of the one or more blades.

8. The method of claim 1, wherein determining the corrected delta TOA comprises:

determining a reseating offset corresponding to each of the one or more blades; and subtracting the reseating offset from the normalized delta TOA resulting in the corrected delta TOA.

9. The method of claim 8, wherein the reseating offset is determined when the one or more blades are operating at base load.

10. The method of claim 8, wherein the reseating offset is determined when the one or more blades are operating for the first time after a start up.

11. The method of claim 8, wherein determining the reseating offset comprises:

retrieving one or more normalized delta TOA corresponding to each of the one or more blades;

determining one or more corrected delta TOA utilizing the one or more normalized delta TOA;

determining a first mean of the one or more normalized delta TOA;

determining a second mean of the one or more corrected delta TOA; and subtracting the second mean from the first mean resulting in the reseating offset.

12. The method of claim 11, wherein the one or more normalized delta TOA is determined when the one or more blades are not operating in a transient state.

13. The method of claim 1, wherein the one or more operational data comprises an inlet guide vane (IGV) angle, an inlet temperature (CTIM), load, mass flow, discharge pressure, or combinations thereof.

14. A system, comprising a processing subsystem that:

determines a delta TOA corresponding to each of the one or more blades based upon respective actual time of arrival (TOA) of the one or more blades;

determines one or more coefficients based upon one or more operational data;

determines effects of the one or more operational data on the respective actual TOA by utilizing the one or more coefficients and the one or more operational data;

determines a normalized delta TOA corresponding to each of the one or more blades by removing the effects of the one or more operational data from the delta TOA by the processing subsystem; and determines a corrected delta TOA corresponding to each of the one or more blades by removing effects of reseating of the one or more blades from the normalized delta TOA.

15. The system of claim 14 further comprising one or more sensors to generate signals that are representative of the respective actual TOA of the one or more blades.

16. The system of claim 14, further comprising an onsite monitor to generate the one or more operational data.

17. The system of claim 14, further comprising at least one data repository that stores static deflection, delta TOA, actual TOA, intermediate results, or combinations thereof.

18. The method of claim 1, further comprising:

generating static deflection corresponding to the one or more blades based upon the corrected delta TOA; and determining the health of the one or more blades based upon the static deflection.

19. The method of claim 18, wherein determining the health comprises detecting one or more defects or cracks in the one or more blades.

* * * * *